United States Patent
Knott et al.

(10) Patent No.: US 11,279,804 B2
(45) Date of Patent: Mar. 22, 2022

(54) SIOC-BASED POLYETHERSILOXANES

(71) Applicant: Evonik Operations GmbH, Essen (DE)

(72) Inventors: Wilfried Knott, Essen (DE); Horst Dudzik, Essen (DE); Dagmar Windbiel, Essen (DE); Philippe Favresse, Ratingen (DE); Michael Fiedel, Essen (DE); André Brötzmann, Essen (DE); Frauke Henning, Essen (DE); Jan Caßens, Datteln (DE); Michael Ferenz, Essen (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 15/929,844

(22) Filed: May 26, 2020

(65) Prior Publication Data
US 2020/0377669 A1 Dec. 3, 2020

(30) Foreign Application Priority Data
May 28, 2019 (EP) .................................... 19176886

(51) Int. Cl.
| C08G 77/08 | (2006.01) |
| C08G 77/00 | (2006.01) |
| C08G 77/06 | (2006.01) |
| C08G 77/46 | (2006.01) |

(52) U.S. Cl.
CPC .............. *C08G 77/80* (2013.01); *C08G 77/06* (2013.01); *C08G 77/08* (2013.01); *C08G 77/46* (2013.01)

(58) Field of Classification Search
CPC ........ C08G 77/46; C08G 77/08; C08G 77/06; C08G 77/10
See application file for complete search history.

(56) References Cited

U.S. PATENT DOCUMENTS

| 4,177,201 A * | 12/1979 | de Montigny ......... | C08G 77/14 556/416 |
| 4,497,962 A * | 2/1985 | de Montigny ......... | C08G 77/46 556/446 |
| 8,598,295 B2 | 12/2013 | Henning et al. | |
| 2010/0249339 A1 | 9/2010 | Henning et al. | |
| 2019/0106441 A1 | 4/2019 | Knott et al. | |

FOREIGN PATENT DOCUMENTS

| EP | 3 467 006 | 4/2019 |
| WO | 2009/065644 | 5/2009 |

OTHER PUBLICATIONS

"Superacid Chemistry" Second edition, p. 38 (2009).*
European Search Report dated Nov. 18, 2019 in European Application No. 19176886.0.

* cited by examiner

*Primary Examiner* — Margaret G Moore
(74) *Attorney, Agent, or Firm* — Grüneberg and Myers PLLC

(57) ABSTRACT

Branched SiOC-linked polyethersiloxanes have the following formula (I)

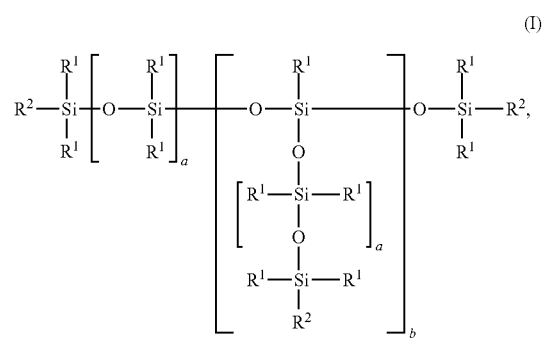

where $R^1$ is an alkyl radical having 1 to 4 carbon atoms or a phenyl radical, but preferably 90% of the radicals $R^1$ are methyl radicals; b has a value of from 1 to 10; a has a value of from 1 to 200, preferably 10 to 100, a value of from 3 to 70 when b is $\geq 1$ and $\leq 4$, or a value of from 3 to 30 when b is >4; and $R^2$ denotes identical or different polyether radicals, but at least one radical $R^2$ is a structural element radical of formula (II):

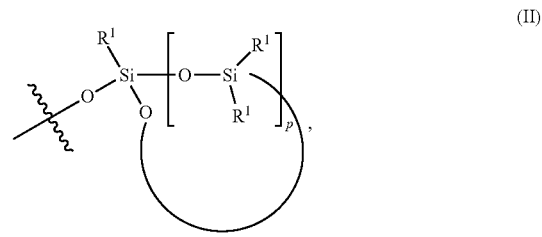

where p=at least 2, preferably p=2-6, particularly preferably p=3.

24 Claims, 1 Drawing Sheet

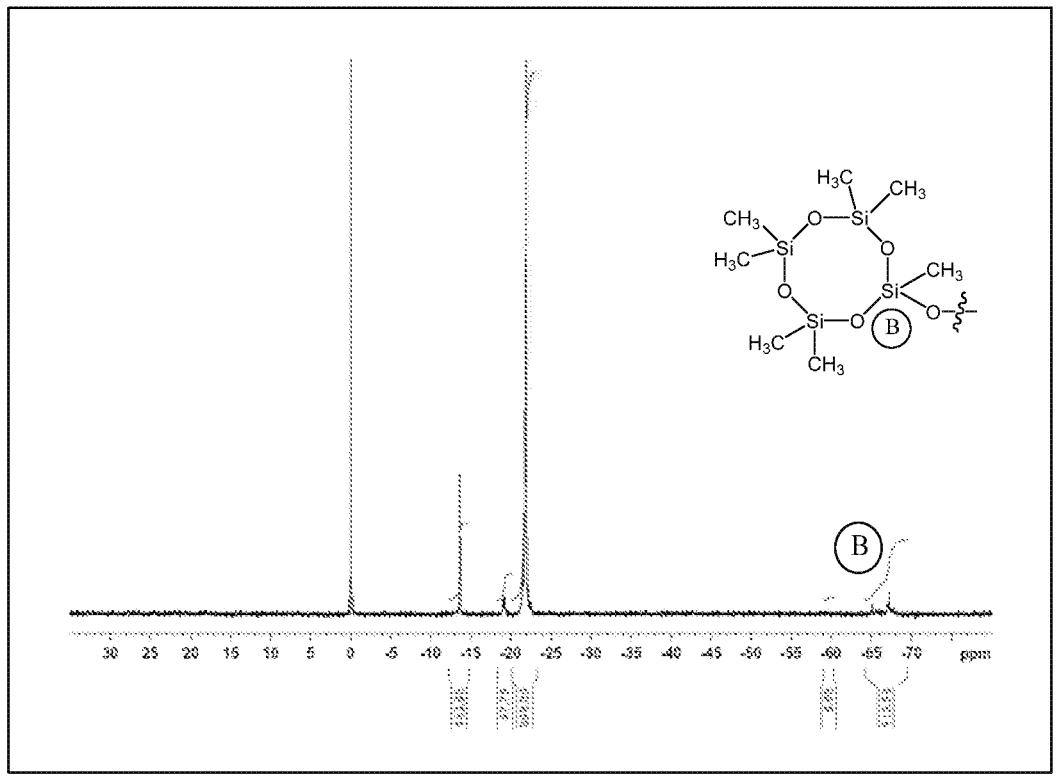

SIOC-BASED POLYETHERSILOXANES

CROSS-REFERENCE TO RELATED APPLICATION

The present application claims the benefit to European application EP 19176886.0, filed on May 28, 2019, the content of which is hereby incorporated by reference in its entirety.

BACKGROUND OF THE INVENTION

Field of the Invention

The invention relates to SiOC-based polyethersiloxanes, to processes for the production thereof and also to the use of the SiOC-based polyethersiloxanes as constituents in interface-active substances, such as in PU foam stabilizers, defoamers, deaerating agents, emulsifiers, demusifiers and paint and levelling additives.

Discussion of the Background

The terms "siloxanes" and "polysiloxanes" are used as synonyms in the present invention.

The term "defoamer" in the present case encompasses both products and formulations that prevent foam and also those that destroy foam and enable deaeration. In practice, the transitions between these product properties are blurred, so that here the common collective term defoamer is used.

In many industrial processes, in particular when work is being carried out in aqueous media, it is necessary to suppress or to completely prevent the undesired formation of foam during the production or processing operations, since foam or heads of froth which form during stirring and dispersing operations or form in the containers during the filling operation can lengthen the production times or reduce the effective volume of the plant or even prevent correct operation thereof, in that overflowing of the formulation out of the mixing tank cannot be avoided and a lack of colour transfer during the application thereof is unavoidable.

This can be achieved by adding defoamers which even at very low application concentrations of from approximately 0.001% by weight are capable of avoiding or destroying undesired foams and which at the same time do not cause any surface defects after application of the systems and suppress air inclusions in the paint. In practice, these aspects must be taken into account at least just as much as good defoaming.

Surface defects are to be understood to be features that are undesirable to the user such as for example pinholes, craters, loss of gloss, orange peel effect, wrinkling and loss of adhesion in the coating system. However, an appropriate long-term stability of the defoamer in formulations is also of high importance to the user since products such as paints are often not used up immediately but instead sometimes only after a relatively long storage. In the case of storage under extreme climatic conditions (heat and solar irradiation), the efficacy of a defoamer formulation can occasionally collapse after only a short time.

Defoamers according to the related art are for example silicone oils, native oils, paraffin and mineral oils, but also hydrophobic polyoxyalkylenes, long-chain alcohols and also mixtures of these products with one another and emulsions thereof.

Defoamers for defoaming aqueous and non-aqueous media and comprising polyoxyalkylene polysiloxane polymers as the active agent with a crucial influence on the defoaming exhibit particular efficacy and storage stability. This includes foam inhibition, defoaming, very good long-term stability, and also outstanding compatibility in aqueous and non-aqueous media. All of these properties are of high importance for modern paint applications.

For the purposes of increasing the efficacy, what are known as hydrophobic solids are frequently also added in amounts of 0.1% to 10% by weight, which promote dewetting processes in a targeted manner at foam lamellae and hence assist the foam collapse very effectively. Suitable hydrophobic solids are corresponding hydrophobized or non-hydrophobized silicas, hydrophobized or non-hydrophobized precipitated silica, metal carboxylates such as metal stearates, polyolefins and natural or synthetic waxes such as paraffin waxes, polyolefin waxes, amide waxes and urea or poly(ureas), such as described for example in DE 28 29 906 A1.

By means of addition of suitable emulsifiers or protective colloids, such defoamer formulations can also be converted into aqueous emulsions which can be formulated more simply in paint formulations in terms of application. CN 101100515 A discusses a specific emulsification process, which can likewise be used for the emulsification of the polyether polysiloxane polymers.

It is likewise known to use polyoxyalkylene polysiloxane block copolymers as defoaming agents. For instance, DE 1 012 602 by way of example describes polyoxyalkylene polysiloxane polymers having an A'-B'-A' structure, where A' denotes the polyoxyalkylene blocks and B' denotes a polysiloxane block. These active agents are assigned to the so-called SiOC polyethersiloxane defoamer substance class.

DE 2443853 describes defoaming preparations which comprise not only linear but also branched polyoxyalkylene polysiloxane block copolymers.

U.S. Pat. No. 4,028,218 describes a process for preventing or destroying foam in aqueous solutions or dispersions, which uses a similar preparation as that described in DE 2443853. The preparation essentially differs in an additional content of organic oil which likewise has a defoaming action. Suitable organic oils are the esters of alcohols and fatty acids, such as for example vegetable or animal oils, or mineral oils, polybutadiene oils or polypropylene glycols.

According to the current state of the art, a plurality of process variants is used for the production of the economically important substance class of the SiOC-linked polyethersiloxanes, also referred to as silicone polyethers or polysiloxane polyether copolymers.

It is known to those skilled in the art that these SiOC-linked polyethersiloxanes are a product class which does not have a tendency to become a resin. Even if SiOC-linked polyethersiloxanes contain reactive groups such as hydroxy groups, they are not used for the targeted crosslinking. In contrast to silicone resins, they are not film-forming.

SiOC-linked polyethersiloxanes are classically formed by the reaction of a polysiloxane having a leaving group (e.g. halogen) bonded to the silicon atom and an alcohol or polyetherol. The latter is typically obtained beforehand by alkoxylation of hydroxy-functional starter compounds such as for example methanol, butanol or glycol with alkylene oxides. Chlorine as leaving group on the silicon atom is in particular known and widespread as starting compounds for this type of reaction. However, chlorosiloxanes and chloropolysiloxanes are difficult to handle as they are extremely reactive. The use thereof is additionally associated with the disadvantage that hydrogen chloride formed in the course of the reaction necessitates corrosion-resistant installations and results in both technical and environmental challenges. Moreover, organic chlorine compounds which are undesirable for toxicological reasons can also be formed in the presence of chloropolysiloxanes and alcohols or polyetherols, such that in the production process there are the requirements of suppressing and destroying these. As is known to those skilled in the art, it is also necessary in the case of the reaction of a chlorosiloxane with an alcohol or polyetherols to achieve and to ensure a quantitative conversion, with the result that the OH-functional component often needs to be used in a stoichiometric excess based on the chlorine leaving group of the polysiloxane component. In practice, the use of a polyether excess means that the polyethersiloxanes thus produced unavoidably contain relatively large amounts of unreacted excess polyethers which lower the concentration of the active polyethersiloxane component and impair the performance properties of the polyethersiloxanes. It is frequently additionally necessary to use HCl scavengers in the above-described process in order to achieve suitable quantitative conversions. The use of HCl scavengers results in the formation of large quantities of salt, the removal of which on an industrial scale causes problems.

One possible alternative to this process comprises reacting alcohols or polyetherols with hydrosiloxanes in which hydrogen is directly bonded to silicon. Under suitable conditions the formation of the SiOC bond here results merely in elimination of hydrogen. This process, known as dehydrogenative condensation, can be performed exclusively only in the presence of a catalyst. U.S. Pat. No. 5,147,965 refers to a process described in the Japanese patent publication JPS 4819941, in which a hydrosiloxane is reacted with an alcohol with the addition of alkali metal hydroxides or alkali metal alkoxides. A disadvantage with this process is that the catalysts have to be neutralized after reaction is complete and the salt load formed in the process, although it is much lower than that of the chlorosiloxane process, nevertheless requires complicated removal by filtration.

EP 0475440 describes a process in which hydrosiloxanes are reacted with an alcohol with addition of an organic acid in the presence of a Pt salt. The reaction unavoidably requires the use of large amounts of organic acid (0.1 to 1 mol based on alcohol), toluene as solvent and a platinum salt. Since both toluene and acid are undesirable in the end product, they must be removed in turn after the end of the reaction. In addition, platinum salts are not only expensive but also not unproblematic from a physiological viewpoint. Specifically in the cosmetics industry sector, there is a demand for platinum-free products.

The process described in J. Boyer, R. J. P. Corriu, R. Perz, C. Reye, J. Organomet. Chem. 1978, 157, 153-162 does not require the use of heavy metals. Salts such as potassium tartrate, phthalate or formate for example are used as heterogeneous catalysts. However, the reactions require equimolar use of the salts based on the SiH units and are successful only at high temperatures of approx. 180° C. Both the drastic conditions and the large quantities of salt required render this process unattractive for the technical and industrial scale.

Patent applications DE 10 312 636 and DE 10 359 764 utilize boron-containing catalysts for the dehydrogenative condensation of hydrosiloxanes and alcohols. As much as these dehydrogenative processes for SiOC linking are attractive, specifically in relation to the avoidance of liquid and/or solid by-products, both the use of costly and toxic catalysts such as for example tris(pentafluorophenyl)borane and the safe handling of the hydrogen gas formed in the synthesis stand in the way of widespread application of the technology on an industrial scale.

The present invention is accordingly based on the object of providing suitable branched SiOC-linked polyethersiloxanes which have good defoaming characteristics and greatly repress or even completely avoid the introduction of air into the paint, but at the same time do not cause any wetting defects during application to a surface and moreover exhibit improved storage stability.

SUMMARY OF THE INVENTION

The present inventions includes the following embodiments:

1. Branched SiOC-linked polyethersiloxanes of the following idealized formula (I)

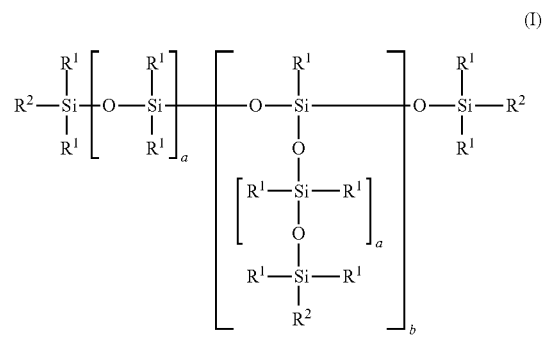

where
$R^1$ is an alkyl radical having 1 to 4 carbon atoms or a phenyl radical, but preferably 90% of the radicals $R^1$ are methyl radicals and where
b has a value of from 1 to 10,
a has a value of from 1 to 200, preferably 10 to 100, has a value of from 3 to 70 when b is $\geq 1$ and $\leq 4$, or has a value of from 3 to 30 when b is $>4$, and
$R^2$ denotes identical or different polyether radicals, but at least one radical $R^2$ is a structural element radical of formula (II):

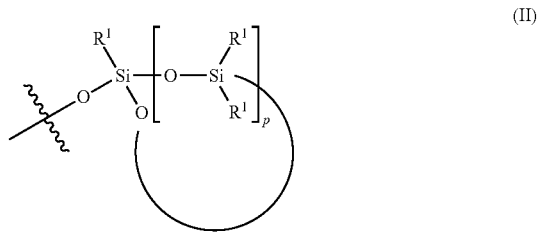

where p=at least 2, preferably p=2-6, particularly preferably p=3.

2. Branched SiOC-linked polyethersiloxanes according to embodiment 1, characterized in that the molar percentage of the structural element radicals of formula (II) based on the entirety of all Si atoms is less than the molar percentage of the polyether radicals based on the entirety of Si atoms.

3. Branched SiOC-linked polyethersiloxanes according to embodiment 1, characterized in that the molar ratio of polyether radicals to the molar ratio of structural element radicals of formula (II) is at least 1:0.9, preferably at least 1:0.5, particularly preferably at least 1:0.2.

4. Branched SiOC-linked polyethersiloxanes according to any of the preceding embodiments, characterized in that the polyether radical corresponds proceeding from one or more identical or different polyetherols of formula (III)

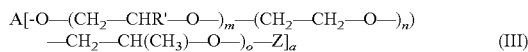
A[-O—(CH$_2$—CHR'—O—)$_m$—(CH$_2$—CH$_2$—O—)$_n$
—CH$_2$—CH(CH$_3$)—O—)$_o$—Z]$_a$  (III)

where

A is either hydrogen or a saturated or unsaturated organic radical comprising at least one carbon atom, preferably an organic radical comprising at least one carbon atom of an organic starter compound for preparing the compound, particularly preferably a methyl, ethyl, propyl, isopropyl, butyl, isobutyl, vinyl or allyl group, R' is independently a saturated alkyl group comprising 2-18 carbon atoms or an aromatic radical, preferably an ethyl group or a phenyl radical respectively, z is hydrogen, m equals from 0 to 50, preferably from 0 to 30, particularly preferably from 0 to 20, n equals from 0 to 250, preferably from 3 to 220, particularly preferably from 5 to 200, o equals from 0 to 250, preferably from 3 to 220, particularly preferably from 5 to 200, a equals from 1 to 8, preferably from greater than 1 to 6, particularly preferably 1, 2, 3 or 4, with the proviso that the sum total of m, n and o is equal to or greater than 1.

5. Defoamers, deaerating agents, PU foam stabilizers, emulsifiers, demulsifiers, paint and levelling additives containing branched SiOC-linked polyethersiloxanes according to any of embodiments 1-4.

6. Use of the branched SiOC-linked polyethersiloxanes according to any of embodiments 1-4 for the production of PU foam stabilizers, defoamers, deaerating agents, emulsifiers, demulsifiers and paint and levelling additives.

7. Use of the branched SiOC-linked polyethersiloxanes according to any of embodiments 1-4 for the production of diesel defoamers, of hydrophobizing agents, of polymer dispersions, of adhesives or sealants, of paper towels; of cleaning and care formulations for the household or for industrial applications, in particular for the production of fabric softeners, of cosmetic, pharmaceutical and dermatological compositions, in particular cosmetic cleansing and care formulations, hair treatment agents and hair aftertreatment agents; of construction material compositions, of thermoplastic shaped bodies.

8. Use of the branched SiOC-linked polyethersiloxanes according to any of embodiments 1-4 as processing aid in the extrusion of thermoplastics, as adjuvant in crop protection, as additive for the cleaning and care of hard surfaces, for the surface treatment of fibres, particles or fabrics, in particular for the finishing or impregnation of textiles, or in the coating of fillers.

9. Process for producing branched SiOC-linked polyethersiloxanes according to any of embodiments 1-4, characterized in that superacidic, equilibrated acetoxy group-bearing, branched. polysiloxanes of the following formula (IV)

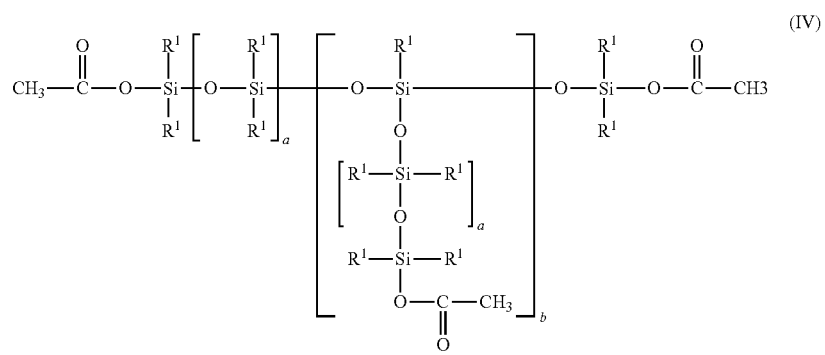

where

R$^1$ is an alkyl radical having 1 to 4 carbon atoms or a phenyl radical, but preferably 90% of the radicals R$^1$ are methyl radicals and where b has a value of from 1 to 10, a has a value of from 1 to 200, preferably 10 to 100, has a value of from 3 to 70 when b is ≥1 and ≤4, or has a value of from 3 to 30 when b is >4, are reacted with polyetherols.

10. Process according to embodiment 9, characterized in that the polyetherol used corresponds to formula (III).

11. Process according to embodiment 9 or 10, characterized in that the polyetherol exclusively comprises hydrogen atoms, oxygen atoms and carbon atoms.

12. Process according to any of embodiments 9-11, wherein at least 1 mol of polyether-bonded OH functionality is used per mole of acetoxy group of the branched polysiloxane, preferably 1 to 2 mol of polyether-bonded OH functionality, preferably 1.1 to 1.6 mol of polyether-bonded OH functionality, particularly preferably 1.2 to 1.4 mol of polyether-bonded OH functionality per mole of acetoxy group of the branched siloxane.

13. Process according to any of embodiments 9-12, characterized in that the replacement of the siloxane-bonded acetoxy groups via the reaction with polyetherols is conducted in the temperature range from 40 to 180° C., preferably between 80° C. and 150° C.

14. Process according to any of embodiments 9-13, characterized in that the replacement of the siloxane-bonded acetoxy groups via the reaction with polyetherols is conducted at reduced pressure and/or while passing through an inert gas.

15. Process according to any of embodiments 9-14, wherein the replacement of the siloxane-bonded acetoxy groups via the reaction with polyetherols is effected at least in the presence of a base, in particular in the presence of carbonate salts, ammonia or of an organic amine.

16. Process according to any of embodiments 9-15, wherein the replacement of the siloxane-bonded acetoxy groups via the reaction with polyetherols is effected using an inert solvent, preferably using an inert solvent which at the same time forms an azeotrope with formed, and possibly already present, acetic acid, wherein the inert solvent is advantageously an aromatic, preferably alkylaromatic solvent and very particularly preferably is toluene.

17. Process according to any of embodiments 9 to 15, wherein the replacement of the siloxane-bonded acetoxy groups via the reaction with polyetherols is done without solvent.

BRIEF DESCRIPTION OF DRAWING

The FIGURE shows a $^{29}$Si NMR spectrum, where the T unit (B) is assigned at −65 ppm.

DETAILED DESCRIPTION OF THE INVENTION

An object underlying the invention can surprisingly be achieved when branched SiOC-linked polyethersiloxanes of the following idealized formula (I)

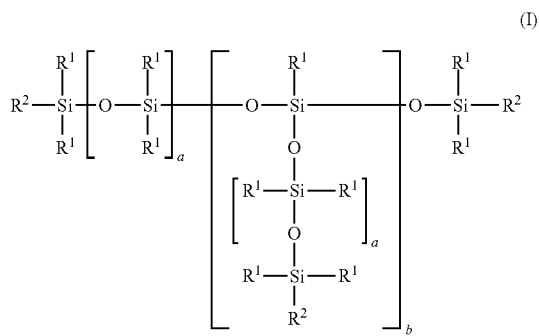

where
$R^1$ is an alkyl radical having 1 to 4 carbon atoms or a phenyl radical, but preferably 90% of the radicals $R^1$ are methyl radicals and where
b has a value of from 1 to 10,
a has a value of from 1 to 200, preferably 10 to 100,
has a value of from 3 to 70 when b is ≥1 and ≤4, or
has a value of from 3 to 30 when b is >4, and
$R^2$ denotes identical or different polyether radicals, but at least one radical $R^2$ is a structural element radical of formula (II):

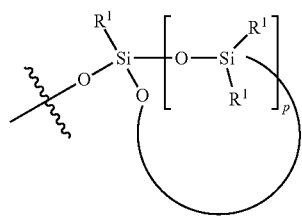

where p=at least 2, preferably p=2-6, particularly preferably p=3,
are used.

The index values recited here and the value ranges of the indices specified can be understood to mean averages (weight averages) of the possible statistical distribution of the actual structures present and/or the mixtures thereof. This also applies to structural formulae exactly reproduced per se as such, for example to formula (II).

The units referred to by a and b may either be in a statistical mixture or else may be present in blocks in the chain. Statistical distributions may have a blockwise structure with any number of blocks and any sequence or they may be subject to a randomized distribution; they may also have an alternating structure or else form a gradient along the chain; in particular, they can also form any mixed forms in Which groups of different distributions may optionally follow one another. Specific embodiments may lead to restrictions of the statistical distributions as a result of the embodiment. There is no change in the statistical distribution for all regions unaffected by the restriction.

Preferably, the molar percentage of the structural element radicals of formula (II) based on the entirety of all Si atoms is less than the molar percentage of the polyether radicals based on the entirety of Si atoms.

Preferably, the molar ratio of polyether radicals to the molar ratio of structural element radicals of formula (II) is at least 1:0.9, preferably at least 1:0.5, particularly preferably at least 1:0.2.

The inventors have found that the branched SiOC-linked polyethersiloxanes according to the invention are distinguished by a characteristic structural element radical of formula (II). Evidence for the presence of this special structural element radical of formula (II) is provided by the $^{29}$Si NMR spectra which can be assigned to the T unit (B) in the region of −60 ppm to −70 ppm.

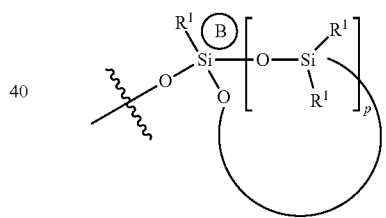

In the silicone skeleton of the branched SiOC-linked polyethersiloxane according to the invention there is preferably a heptamethylcyclotetrasiloxanyl radical, where p=3 and $R^1$=methyl radical, comprising three D units and one T unit (B) which is connected to the remainder of the silicone skeleton, of formula (IIa)

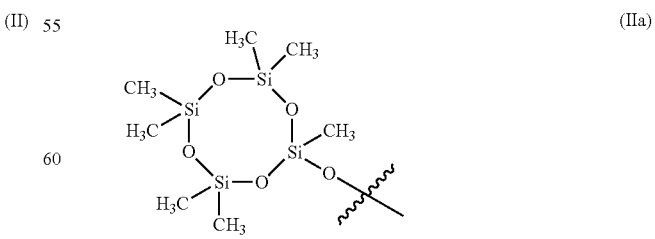

The T unit (B can be assigned at −65 ppm in the $^{29}$Si NMR spectrum (see FIGURE). The structural element radical $R^2$=heptamethylcyclotetrasiloxanyl radical (p=3) can preferably thus be detected by the characteristic signal at −65.0 ppm in the $^{29}$Si NMR spectrum.

The inventors have surprisingly found that the presence of this structural element radical that is present according to the invention exhibits positive effects with respect to the performance properties of the SiOC-based polyethersiloxane. For instance, it is found for example that the PU flexible foam stabilizers, defoamers, deaerating, agents, emulsifiers, demulsifiers, and paint and levelling additives derived from the SiOC polyethersiloxane according to the invention show a much more well-balanced picture with respect to activity such as for example cell opening, defoaming, compatibility and long-term stability when compared directly to surface-active substances produced conventionally according to the related art.

Preferably, the polyether radical is based on one or more identical or different polyetherols of formula (III)

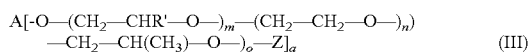 (III)

where

A is either hydrogen or a saturated or unsaturated organic radical comprising at least one carbon atom, preferably an organic radical comprising at least one carbon atom of an organic starter compound for preparing the compound, particularly preferably a methyl, ethyl, propyl, isopropyl, butyl, isobutyl, vinyl or allyl group, R' is independently a saturated alkyl group comprising 2-18 carbon atoms or an aromatic radical, preferably an ethyl group or a phenyl radical respectively, Z is hydrogen, m equals from 0 to 50, preferably from 0 to 30, particularly preferably from 0 to 20, n equals from 0 to 250, preferably from 3 to 220, particularly preferably from 5 to 200, o equals from 0 to 250, preferably from 3 to 220, particularly preferably from 5 to 200, a equals from 1 to 8, preferably from greater than 1 to 6, particularly preferably 1, 2, 3 or 4, with the proviso that the sum total of m, n and o is equal to or greater than 1.

The index values recited here and the value ranges of the indices specified can be understood to mean averages (weight averages) of the possible statistical distribution of the actual structures present and/or the mixtures thereof. This also applies to structural formulae exactly reproduced per se as such, for example to formula (III).

The units referred to by m, n and o may either be in a statistical mixture or else may be present in blocks in the chain. Statistical distributions may have a blockwise structure with any number of blocks and any sequence or they may be subject to a randomized distribution; they may also have an alternating structure or else form a gradient along the chain; in particular, they can also form any mixed forms in which groups of different distributions may optionally follow one another. Specific embodiments may lead to restrictions of the statistical distributions as a result of the embodiment. There is no change in the statistical distribution for all regions unaffected by the restriction.

In the context of the present invention, radical A is preferably to be understood to mean radicals of substances forming the start of the compound of formulae (III) to be produced which is obtained by addition of alkylene oxides. The starter compound is preferably selected from the group of alcohols, polyetherols and phenols. The starter compound containing the group A which is used is preferably a mono- or polyhydric polyether alcohol and/or a mono- or polyhydric alcohol or any desired mixtures thereof. If a plurality of starter compounds A has been used as a mixture, the index a may also be subject to a statistical distribution.

Monomers used with preference in the alkoxylation reaction are ethylene oxide, propylene oxide, butylene oxide and/or styrene oxide and also any desired mixtures of these epoxides. The different monomers may be used in pure form or in a mixture. A further epoxide can also be metered continuously over time into an epoxide already present in the reaction mixture, so as to give rise to an increasing concentration gradient of the epoxide added continuously. The polyoxyalkylenes formed are thus subject to a statistical distribution in the end product, restrictions being determinable via the metered addition. In this case of the continuous addition of a further epoxide to an epoxide already present in the reaction mixture, a structure gradient along the length of the chain is then to be expected. The correlations between metered addition and product structure are known to those skilled in the art.

The invention further provides PU foam stabilizers, defoamers, deaerating agents, emulsifiers, demulsifiers, paint and levelling additives containing inventive branched SiOC-linked polyethersiloxanes of general formula (I).

The invention also provides for the use of the branched SiOC-linked polyethersiloxanes of general formula (I) for the production of MI foam stabilizers, defoamers, deaerating agents, emulsifiers, demulsifiers and paint and levelling additives.

The defoamers according to the invention exhibit outstanding defoaming capability coupled with very good long-term stability of the defoaming and very good compatibility in the coating formulation, and can be used in a large number of industrial processes, such as for example for defoaming cooling lubricants, polymer dispersions, coatings such as paints, varnishes and printing inks, adhesives, in paper coating etc.

The invention further provides for the use of the branched SiOC-linked polyethersiloxanes of general formula (I) for the production of diesel defoamers, of hydrophobizing agents, of polymer dispersions, of adhesives or sealants, of paper towels; of cleaning and care formulations for the household or for industrial applications, in particular for the production of fabric softeners, of cosmetic, pharmaceutical and dermatological compositions, in particular cosmetic cleansing and care formulations, hair treatment agents and hair aftertreatment agents; of construction material compositions, of thermoplastic shaped bodies.

In addition, the use of the branched SiOC-linked polyethersiloxanes of general formula (I) as processing aid in the extrusion of thermoplastics, as adjuvant in crop protection, as additive for the cleaning and care of hard surfaces, for the surface treatment of fibres, particles or fabrics, in particular for the finishing or impregnation of textiles, or in the coating of fillers.

They can preferably be added directly or in emulsified form, but preferably in the form of an aqueous emulsion, to the formulations tending toward foam formation in an amount of 0.001% by weight to 3% by weight based on the total liquid. When adding in pure, non-predispersed form, care should be taken to ensure adequate incorporation.

The branched SiOC-linked polyethersiloxanes according to the invention are preferably produced by reacting polyetherols of formula (III) with superacidic, equilibrated acetoxy group-bearing, branched polysiloxanes of the following formula (IV)

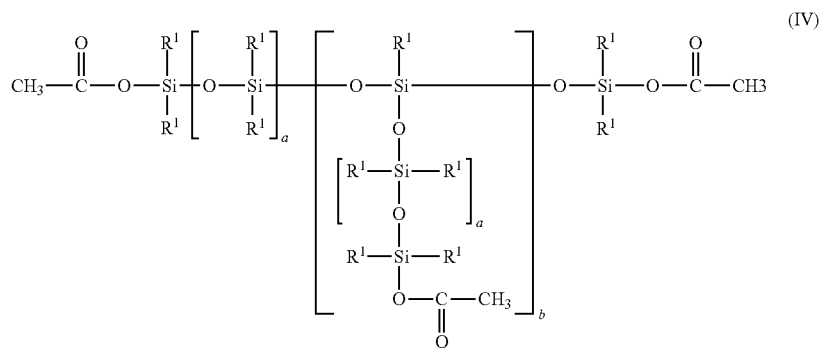

(IV)

where

R¹ is an alkyl radical having 1 to 4 carbon atoms or a phenyl radical, but preferably 90% of the radicals R¹ are methyl radicals and where b has a value of from 1 to 10, a has a value of from 1 to 200, preferably 10 to 100, has a value of from 3 to 70 when b is ≥1 and ≤4, or has a value of from 3 to 30 when b is >4.

Compounds of formula (III) that can be used according to the invention as polyetherols and processes for the production thereof are described for example in EP 0075703, U.S. Pat. No. 3,775,452 and EP 1031603. Suitable processes utilize, for example, basic catalysts, such as for example the alkali metal hydroxides and alkali metal methoxides. The use of KOH is particularly widespread and has been known for many years. Typically, a hydroxy-functional starter that is generally of low molecular weight, that is to say having a molecular weight of less than 200 g/mol, such as butanol, allyl alcohol, propylene glycol or glycerol, is reacted with an alkylene oxide such as ethylene oxide, propylene oxide, butylene oxide or a mixture of different alkylene oxides in the presence of the alkaline catalyst to give a polyoxyalkylene polyether. The strongly alkaline reaction conditions in this so-called living polymerization promote various side reactions. The compounds of formulae (II) may also be produced by double metal cyanide catalysis. Polyethers produced by double metal cyanide catalysis generally have a particularly low content of unsaturated end groups of less than or equal to 0.02 milliequivalents per gram of polyether compound (meq/g), preferably less than or equal to 0.015 meq/g, particularly preferably less than or equal to 0.01 meq/g (determination method ASTM D2849-69), contain distinctly fewer monools and generally have a low polydispersity of less than 1.5. The polydispersity (PD) may be determined by a method known per se to those skilled in the art by determining both the number-average molecular weight (Mn) and the weight-average molecular weight (Mw) by gel permeation chromatography (GPC). The polydispersity is given by PD=Mw/Mn. The production of such polyethers is described in U.S. Pat. No. 5,158,922 and EP-A 0654302 for example.

Irrespective of the production route, compounds preferably having a polydispersity Mw/Mn of 1.0 to 1.5, with preference having a polydispersity of 1.0 to 1.3, are preferably suitable.

Depending on the alkylene oxide terminus, the polyetherols to be used according to the invention may have a primary or secondary OH function. From the point of view of the hydrolytic resistance, achieved later, of the SiOC-linked polyethersiloxanes obtained, the use of those polyetherols comprising a secondary alcohol function is preferred in the context of the inventive teaching.

Reactive starting materials used for the production of the SiOC-based polyethersiloxanes according to the invention are preferably acetoxy group-bearing polysiloxanes of branched structural type.

Routes to acetoxy-functional polysiloxanes are described in the literature. The as-yet unpublished European patent applications having the application reference numbers EP 18172882.5, EP 18172876.7, EP 17195510.7, EP 17204277.2, EP 18189073.2 and EP 18210035.4 address the production of trifluoromethanesulfonic acid-acidified, equilibrated acetoxysiloxanes of branched structural type.

Cited as a reference in relation to the M, D, T, Q nomenclature used in the context of this document to describe the structural units of organopolysiloxanes is W. Noll, Chemie und Technologie der Silicone [Chemistry and Technology of the Silicones], Verlag Chemie GmbH, Weinheim (1960), page 2 ff.

Following the teaching of EP 18189073.2, for example, cyclic polysiloxanes, in particular comprising $D_4$ and/or $D_5$, and/or mixtures of cyclic branched polysiloxanes of D/T type are reacted with acetic anhydride while using trifluoromethanesulfonic acid as catalyst and with addition of acetic acid. In addition, EP 18189073.2 states that both mixtures of cyclic branched polysiloxanes of D/T type, which consist exclusively of polysiloxanes having D and units and whose cumulative proportion, determinable with $^{29}Si$ NMR spectroscopy, of D and units present in the siloxane matrix and having Si-alkoxy and/or SiOH groups is less than 2 mole percent, preferably less than 1 mole percent, and which additionally advantageously contain at least 5% by weight of siloxane cycles, such as preferably octamethylcyclotetrasiloxane ($D_4$), decamethylcyclopentasiloxane ($D_5$) and/or mixtures thereof, and also mixtures of cyclic branched siloxanes having exclusively D and T units, whose cumulative proportion, determinable with $^{29}Si$ NMR spectroscopy, of D and units present in the siloxane matrix and having Si-alkoxy and/or SiOH groups is greater than 2 and less than 10 mole percent, are particularly well suited for the production of end-equilibrated polysiloxanes having acetoxy functions.

The as-yet unpublished European application document 18210035.4 likewise describes (i) reaction systems for the production of polysiloxanes bearing acetoxy functions, comprising a) silanes and/or polysiloxanes bearing alkoxy groups and/or b) silanes and/or polysiloxanes bearing acetoxy groups, c) silanes and/or polysiloxanes bearing hydroxy groups, d) optionally simple polysiloxane cycles and/or DT cycles, e) a reaction medium, comprising acetic anhydride, perfluoroalkanesulfonic acid and preferably acetic acid, (ii) a process for producing linear or branched polysiloxanes bearing acetoxy functions. According to the application identified above, it is for example possible to arrive at a branched polysiloxane bearing terminal acetoxy groups by reacting a branched polysilicone equilibrate (=pre-equilibrate) bearing terminal alkoxy groups as sole reactant with a reaction medium consisting of acetic anhydride, trifluoromethanesulfonic acid and acetic acid.

It is preferably conceivable for polysiloxanes having Q units to also be used in addition to polysiloxanes having D and T units, with the proviso that in these mixtures the proportion of Si atoms coming from Q units amounts to ≤10% by mass to ≥0% by mass, preferably ≤5% by mass to ≥0% by mass, wherein the lower limit may be >0 or =0% by mass, but is especially >0% by mass, in each case based on the entirety of all Si atoms.

The provision of mixtures of cyclic branched polysiloxanes of D/T type, which in addition to polysiloxanes having D and T units also contain those having Q units, is readily possible for those skilled in the art for example in analogy to the teaching of the documents mentioned using for example silicic esters yielding Q units ($Si(OR)_4$).

In a preferred embodiment of the invention, acetic acid is added in amounts of 0.4 to 3.5 percent by weight, with preference 0.5 to 3 percent by weight, preferably 0.8 to 1.8 percent by weight, particularly preferably in amounts of 1.0 to 1.5 percent by weight, based on the reaction matrix consisting of acetic anhydride and cyclic polysiloxanes, comprising $D_4$ and/or $D_5$, or consisting of acetic anhydride and mixtures of cyclic branched polysiloxanes of D/T type, optionally also having Q units, or consisting of cyclic polysiloxanes, comprising $D_4$ and/or $D_5$, and mixtures of cyclic branched polysiloxanes of D/T type.

In a preferred embodiment of the invention, the catalyst trifluoromethanesulfonic acid is used in amounts of 0.1 to 1.0 percent by mass, preferably 0.1 to 0.3 percent by mass, based on the reaction matrix consisting of acetic anhydride and cyclic polysiloxanes, especially comprising $D_4$ anchor $D_5$, and/or cyclic branched polysiloxanes of D/T type, optionally also having Q units.

The term "end-equilibrated" is to be understood as meaning that the equilibrium established at a temperature of 23° C. and a pressure of 1013.25 hPa has been reached. The indicator of attaining the equilibrium employed may be the total cycles content determined by gas chromatography and defined as the sum total of the $D_4$, $D_5$, and $D_6$ contents, based on the siloxane matrix and ascertained after derivatization of the α,ω-diacetoxypolydimethylpolysiloxanes to give the corresponding α,ω-diisopropoxypolydimethylpolysiloxanes or after the derivatization of the branched acetoxypolysiloxanes to give the corresponding branched isopropoxysiloxanes. The inventive use of the acetic acid makes it possible here to undershoot without problems otherwise usual equilibrium proportions of about 8 percent by weight for the total cycles content in the branched acetoxypolysiloxanes. It accordingly corresponds to a preferred embodiment when equilibrium proportions of the total cycles content of less than 8, preferably less than 7 percent by weight are undershot in the branched acetoxypolysiloxanes. The derivatization to give the branched isopropoxypolysiloxanes is chosen here deliberately in order to prevent a thermally induced redissociation reaction of the α,ω-diacetoxypolydimethylpolysiloxanes or of the branched acetoxypolysiloxanes which may take place under the conditions of analysis by gas chromatography (regarding the redissociation reaction, see inter alia Pola et al., Collect. Czech. Chem. Commun. 1974, 39(5), 1169-1176 and also W. Simmler, Houben-Weyl, Methods of Organic Chemistry, Vol. V1/2, 4th Edition, O-Metal Derivates of Organic Hydroxy Compounds p. 162 ff.).

It is preferably conceivable for the acetoxy groups of the superacidic, equilibrated, acetoxy group-bearing, branched polysiloxanes of formula (IV) to be endcapped by means of suitable agents such as for example polysiloxane oils, hexamethyldisiloxanes. The replacement of the polysiloxane-bonded acetoxy groups via the reaction with polyetherols can consequently be conducted in a targeted manner. The architecture of the SiOC-linked polyethersiloxane can be varied further as a result.

Preferably, the polyetherol of formula (III) exclusively comprises hydrogen atoms, oxygen atoms and carbon atoms.

Preferably, in the transesterification/the replacement of the polysiloxane-bonded acetoxy groups via the reaction with polyetherols, at least 1 mol of polyether-bonded OH functionality is used per mole of acetoxy group of the branched polysiloxane, preferably 1 to 2 mol of polyether-bonded OH functionality, preferably 1.1 to 1.6 mol of polyether-bonded OH functionality, particularly preferably 1.2 to 1.4 mol of polyether-bonded OH functionality per mole of acetoxy group of the branched poly polysiloxane.

Preferably, the replacement of the polysiloxane-bonded acetoxy groups via the reaction with polyetherols is conducted in the temperature range from 40 to 180° C., preferably between 80 to 150° C.

Preferably, the replacement of the polysiloxane-bonded acetoxy groups via the reaction with polyetherols can be conducted at reduced pressure and/or while passing through an inert gas.

It may be advantageous for the replacement of the polysiloxane-bonded acetoxy groups via the reaction with polyetherols for the process to be effected at least in the presence of a base, in particular in the presence of carbonate salts, ammonia or of an organic amine.

Preferably, the replacement of the polysiloxane-bonded acetoxy groups via the reaction with polyetherols is effected using an inert solvent, preferably using an inert solvent which at the same time forms an azeotrope with formed, and possibly already present, acetic acid, wherein the inert solvent is advantageously an aromatic, preferably alkylaromatic solvent and very particularly preferably selected from toluene, xylene, esters, methoxypropyl acetate, ethyl or butyl acetate.

The replacement of the polysiloxane-bonded acetoxy groups via the reaction with polyetherols can advantageously be conducted without solvent.

Preference is given to not effecting any subsequent stabilization, by means of amines, of the SiOC-linked polyether polysiloxane produced by the process according to the invention.

Preferably, the SiOC-linked polyethersiloxane produced by the process according to the invention has a residual content of octamethylcyclotetrasiloxane, decamethylcyclopentasiloxane and/or dodecamethylcyclohexasiloxane of in each case less than 3% by weight, preferably less than 1% by weight and particularly preferably less than 0.1% by weight, based on the SiOC-linked polyethersiloxane.

Examples are listed hereinafter which serve only to explain this invention for those skilled in the art and do not constitute any restriction whatsoever of the claimed subject matter.

EXAMPLES

Methods

The determination of the water contents is done in principle by the Karl Fischer method based on the DIN 51777, DGF E-III 10 and DGF C-III 13a standards. $^{29}$Si NMR spectroscopy was used in all examples for monitoring the reaction and also for structural assurance of the copolymer structures claimed according to the invention.

In the context of the present invention, the $^{29}$Si NMR samples are analysed at a measurement frequency of 79.49 MHz in a Bruker Avance III spectrometer equipped with a 287430 probe head with gap width of 10 mm, dissolved at 22° C. in $CDCl_3$ and against a tetramethylsilane (TMS) external standard [d($^{29}$Si)=0.0 ppm].

GPCs (gel permeation chromatography) are recorded using THF as the mobile phase on an SDV 1000/10000A column combination having a length of 65 cm, ID 0.80, at a temperature of 30° C. using a SECcurity$^2$ GPC System 1260 (PSS Polymer Standards Service GmbH).

The gas chromatograms are recorded on a GC instrument of the GC 7890B type from Agilent Technologies, equipped with a column of the HP-1 type; 30 m×0.32 mm ID×0.25 µm dF (Agilent Technologies no. 19091Z-413E) and hydrogen as carrier gas, with the following parameters:
Detector: FID; 310° C.
Injector: split; 290° C.
Mode: constant flow, 2 ml/min
Temperature programme: 60° C. at 8° C./min-150° C. at 40° C./min-300° C. 10 min.

The indicator of attaining the equilibrium employed is the total cycles content determined by gas chromatography and defined as the sum total of the $D_4$, $D_5$, and $D_6$ contents, based on the siloxane matrix and ascertained after derivatization of the branched siloxanes bearing acetoxy groups to give the corresponding branched siloxanes bearing isopropoxy groups. The derivatization to give the branched siloxanes bearing isopropoxy groups is chosen here deliberately in order to prevent a thermally induced redissociation reaction of the branched siloxanes bearing acetoxy groups which may take place under the conditions of analysis by gas chromatography (regarding the redissociation reaction, see inter alia J. Pola et al., Collect. Czech. Chem. Commun. 1974, 39(5), 1169-1176 and also W. Simmler, Houben-Weyl, Methods of Organic Chemistry, Vol. V1/2, 4th Edition, O-Metal Derivates of Organic Hydroxy Compounds p. 162 ff.).

II. SiOC-Linked Polyethersiloxanes

Production of a Branched, SiOC-Linked Polyethersiloxane According to the Invention

1a.) Production of a Branched Siloxane Bearing Acetoxy Groups

Example 1: in a 500 ml four-neck round-bottom flask with a precision glass stirrer, an internal thermometer, and a reflux condenser on top, 35.8 g of methyltriethoxysilane (0.201 mol) together with 166.3 g of decamethylcyclopentasiloxane ($D_5$) (0.449 mol) were initially charged at 23° C. with stirring and admixed with 0.51 g of trifluoromethanesulfonic acid (0.25 mass % based on the batch), and equilibrated at 60° C. for 4 hours.

6.8 g of acetic acid were then added and the mixture was stirred for a further 30 minutes at 60° C. 55.0 g of acetic anhydride were added within 5 minutes. A temperature rise to 100° C. could be observed during the addition and the reaction mixture remained virtually colourless.

The reflux condenser was then exchanged for a distillation bridge.

With further heating to 150° C., in the temperature range between 105° C. and 120° C., a distillate passed over, of which 50.1 g was determined. Analysis of the distillate ($^1$H NMR and pH measurement using universal indicator paper) shows that it consists of ethyl acetate and entrained acetic acid.

Thereafter, the reaction batch was left to react further for 6 hours at 150° C., and the reaction batch was allowed to cool to 23° C.

Further inventive branched polysiloxanes bearing acetoxy groups were produced analogously as per table 2.

This affords a virtually colourless, clear, trifluoromethanesulfonic acid-acidified, branched siloxane bearing terminal acetoxy functions, the target structure of which is substantiated by the accompanying $^{29}$Si NMR spectroscopy.

Conversion of the Branched Acetoxysiloxane into the Corresponding Branched Isopropoxysiloxane for Analytical Characterization Immediately after the synthesis, in a 250 ml four-neck round-bottom flask equipped with a precision glass stirrer, an internal thermometer, and a reflux condenser on top, 100.0 g of this trifluoromethanesulfonic acid-acidified, equilibrated branched acetoxysiloxane of example 1 were mixed together with 23.2 g of a molecular sieve-dried isopropanol at 22° C. with stirring. Gaseous ammonia ($NH_3$) was then introduced to the reaction mixture until alkaline reaction (moist universal indicator paper) and the mixture was then stirred at this temperature for a further 45 minutes. The precipitated salts were separated off using a fluted filter.

A colourless, clear liquid is isolated, the accompanying $^{29}$Si NMR spectrum of which substantiates the quantitative conversion of the branched acetoxysiloxane into a branched isopropoxysiloxane.

An aliquot of this branched isopropoxysiloxane was withdrawn and analysed by gas chromatography. The gas chromatogram shows the following contents (table 1, reported in percent by mass):

TABLE 1

| $D_4$ | $D_5$ | $D_6$ | Sum total ($D_4$-$D_6$) | Isopropanol content | Ethyl acetate content |
|---|---|---|---|---|---|
| 0.30% | 1.04% | 1.88% | 3.22% | 11.50% | 2.30% |

Taking the isopropanol excess and the ethyl acetate content into account, the contents of siloxane cycles ($D_4$, $D_5$ and $D_6$) are calculated here solely based on the siloxane proportion.

1B.) Replacement of the Siloxane-Bonded Acetoxy Groups Via the Reaction with Polyetherols In a 500 ml four-neck flask with a precision glass stirrer, an internal thermometer, and a reflux condenser on top, 76.1 g of a butanol-started polyetherol (propylene oxide proportion of 100%) having a molar mass of 1935 g/mol (molar mass determined according to OH number) in 200 ml of toluene were initially charged with stirring and admixed with 20 g of the branched trifluoromethanesulfonic acid-acidified acetoxysiloxane produced in example 1a).

Examples 2-6 were reacted with this polyetherol analogously, see table 2.

For examples 7-12, a butanol-started polyetherol having a propylene oxide proportion of 90% and an ethylene oxide proportion of 10% and having a molar mass of 1705 g/mol (molar mass determined according to OH number) was used for the transesterification. Further information can be found in Table 2.

The reaction mixture was heated to 50° C. with continued stirring for 30 minutes. Then, over the course of a further 30 minutes, firstly the amount of gaseous ammonia required for neutralization was introduced into the reaction matrix. Over the course of a further 45 minutes, an additional gentle ammonia stream was introduced so that the reaction mixture clearly shows alkaline reaction (moist indicator paper).

The precipitated salts were removed from the toluenic phase via a double-fluted filter.

The crude product was freed of toluene by distillation on a rotary evaporator at a bottom temperature of 70° C. and an applied auxiliary vacuum of 1 mbar.

The virtually colourless preparation of an SiOC-linked branched polyethersiloxane, the target structure of which is assured by means of a $^{29}$Si NMR spectrum and which in addition has the signal characteristic for the heptamethylcyclotetrasiloxanyl radical at −65 ppm, is isolated.

2b.) Transesterification

A 1 litre four-neck flask equipped with stirrer, thermometer, distillation bridge and gas introduction pipe was initially charged with 533.0 g of a butanol-started polyetherol (propylene oxide proportion of 100%) having a molar mass of 1935 g/mol (molar mass determined according to OH number). The polyetherol was then heated to 110° C. while introducing dry nitrogen. After the desired temperature had been reached, the installation was evacuated using a rotary oil vacuum pump and a vacuum of approx. 10 mm is set by means of introduction of nitrogen. After 1 hour, the water content of the mixture was <0.02% and was thus prepared for the reaction with the chloropolysiloxane. The mixture was cooled down to 50° C.

Under a nitrogen counter current, 248.5 g of the chloropolysiloxane from 2a) was weighed by means of a syringe into a dropping funnel pre-dried at 100° C. and equipped with gas equalization, gas introduction tube, and a drying tube placed on top, under inert conditions. The distillation apparatus was then exchanged for this dropping funnel and the chloropolysiloxane was added dropwise within 30 minutes. As a result of the introduction of ammonia, the reaction accelerates and ammonium chloride precipitates. After 1 hour, the mixture was heated to 80° C. and the introduction of ammonia was continued until a sample no longer showed any traces of acid on moist pH paper. The dropping funnel

TABLE 2

| Raw materials | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 1a) Production of a branched siloxane bearing acetoxy groups | | | | | | | | | | | | |
| Methyltriethoxysilane | 35.8 | 35.8 | 35.8 | 35.8 | 35.8 | 35.8 | 35.8 | 35.8 | 35.8 | 35.8 | 35.8 | 35.8 |
| D5 | 166.3 | 151.3 | 180.1 | 166.3 | 151.3 | 180.1 | 166.3 | 151.3 | 180.1 | 166.3 | 151.3 | 180.1 |
| Trifluoromethanesulfonic acid | 0.5 | 0.5 | 0.5 | 0.5 | 0.5 | 0.5 | 0.5 | 0.5 | 0.5 | 0.5 | 0.5 | 0.5 |
| Acetic acid | 6.8 | 6.8 | 6.8 | 6.8 | 6.8 | 6.8 | 6.8 | 6.8 | 6.8 | 6.8 | 6.8 | 6.8 |
| Acetic anhydride | 55.0 | 55.0 | 55.0 | 60.0 | 60.0 | 60.0 | 55.0 | 55.0 | 55.0 | 60.0 | 60.0 | 60.0 |
| Ethyl acetate | 50.1 | 50.1 | 50.1 | 50.1 | 50.1 | 50.1 | 50.1 | 50.1 | 50.1 | 50.1 | 50.1 | 50.1 |
| 1b) Replacement of the siloxane-bonded acetoxy groups via the reaction with polyetherols | | | | | | | | | | | | |
| Acetoxy polysiloxane from 1a) | 20.0 | 20.0 | 20.0 | 20.0 | 20.0 | 20.0 | 20.0 | 20.0 | 20.0 | 20.0 | 20.0 | 20.0 |
| Polyetherol (propylene oxide proportion of 100%) | 76.1 | 79.6 | 73.1 | 83.3 | 87.3 | 75.8 | | | | | | |
| Polyetherol (propylene oxide proportion of 90% and ethylene oxide proportion of 10%) | | | | | | | 68.1 | 71.3 | 65.4 | 74.5 | 78.1 | 67.8 |

2.) Comparative Example (CM)

2a.) Production of a Chloropolysiloxane

The chloropolysiloxanes are produced in a manner known per se. An equilibrium forms between the cycles and a chloro-functional dimethylpolysiloxane in this reaction. This reaction mixture, consisting of 27.2 g of dimethyldichlorosilane, 220 g of D4/D5 cycle mixture, can be used immediately for the further conversion. In the case of use of iron(III) chloride as catalyst, however, prior removal of the catalyst using activated carbon is recommended in order to avoid undesired discolorations as a result of the presence of the iron catalyst. Chemical characterization is done via determination of the acid value. This is 1.61 acid equivalents per kg of chlorodimethylpolysiloxane.

was then exchanged for the distillation bridge again and the excess, dissolved ammonia was removed from the reaction mixture by applying a vacuum of approx. 133 Pa. After cooling down to room temperature, the mixture was filtered. This afforded a liquid, clear, colourless end product having a viscosity at room temperature according to Höppler of approx. 420 mPas.

II. Performance Tests

For the performance testing, the 78.0% by weight polyethersiloxanes were admixed with disperse, hydrophobized fumed silica (2.0% by weight) and converted using non-ionic emulsifiers (mixture of polyoxyethylene fatty alcohol ether and polyoxyethylene triglyceride having a mixture HLB of 13) into a 20% aqueous defoamer emulsion.

The emulsions tested (examples 1E-12E and comparative example CE) were produced with the polyethersiloxanes from examples 1-12 and CM.

IIa.) Testing in Paper-Coating Slip 100 g of the paper-coating slip Unilabel T from SICPA S.A. Germany, 71522 Backnang, which had been admixed with 0.2% by weight of defoamer emulsion (examples 1E-12E and comparative example CE), are added at 20° C. into a 250 ml beaker (6 cm diameter) and stirred with a turbine stirrer (4 cm diameter) for 1 minute at 2500 rpm. A tared volumetric flask was then immediately filled up to the calibration mark with the stirred coating slip and the weight was determined by weighing. The weight depends on the proportion of air incorporated by stirring and is therefore a measure of the effectiveness of the antifoaming agent tested. The content of air can be calculated by the formula below.

% by volume of air=$100-(g*2)/D$

Weight of 50 ml of stirred coating slip
D density of the air-free coating slip

In order to test compatibility, the dispersion admixed with defoamer was knife-coated onto a PE film. After drying the coating, this is then visually assessed (table 3).

The defoamers according to the invention exhibit slight to no wetting defects. In addition, these properties are also stable after storage, which is not the case for conventional defoamers (CE).

at room temperature, the defoamer emulsions present in the paints or varnishes are tested with respect to their defoaming action.

For this purpose, 40 g of the paint (15 g in the case of parquet varnish) were applied to a painted contrast chart (24 cm×21 cm, black/white) and spread homogeneously with the open-pore foam roller (with a mohair roller in the case of parquet varnish). After a drying time of 24 hours at room temperature for the paint or the varnish, the surface of the coat of paint is visually assessed for foam bubbles and defects (Wetting defects). The results are then classified according to a grading system (from 1 for no foam bubbles and no wetting defects to 5 for very many foam bubbles and very many wetting defects (craters)).

Stirring Test

A stirring test is additionally performed with the varnish. This stirring test also serves to test the products with respect to their defoaming action. For this purpose, 50 g of the varnish were weighed into a 180 ml PE beaker and stirred for three minutes at 3000 rpm using a dispersing disc, d=30 mm. Immediately after completion of the stirring test, 45 g

TABLE 3

Assessment of performance testing in paper-coating slip

| | 2 hours after incorporation of the defoamer | | 2 weeks of storage at RT after incorporation of the defoamer | |
|---|---|---|---|---|
| | % by volume of air | Application | % by volume of air | Application |
| without defoamer | 13.5 | foam bubbles | 13.8 | foam bubbles |
| Example 1E | 3.2 | no wetting defects | 4.3 | no wetting defects |
| Example 2E | 3.4 | no wetting defects | 3.9 | no wetting defects |
| Example 3E | 3.1 | slight wetting defects | 3.7 | slight wetting defects |
| Example 4E | 3.2 | no wetting defects | 4.1 | no wetting defects |
| Example 5E | 3.4 | no wetting defects | 3.8 | no wetting defects |
| Example 6E | 3.1 | slight wetting defects | 3.6 | slight wetting defects |
| Example 7E | 3.1 | no wetting defects | 4.1 | no wetting defects |
| Example 8E | 3.4 | only slight wetting defects | 3.9 | only slight wetting defects |
| Example 9E | 3.1 | slight wetting defects | 3.8 | slight wetting defects |
| Example 10E | 3.1 | no wetting defects | 4.2 | no wetting defects |
| Example 11E | 3.3 | only slight wetting defects | 4 | only slight wetting defects |
| Example 12E | 3.1 | slight wetting defects | 3.7 | slight wetting defects |
| Example CE | 3.1 | minor wetting defects | 12.7 | foam bubbles |

IIb.) Foam Roller Test and Stirring Test

Foam Roller Test

For testing the defoaming action of the products according to the invention compared to products of the related art, what is known as an open-pore foam roller test and a stirring test are performed. For the foam roller test, the products to be tested are incorporated into a high-gloss emulsion paint based on a pure acrylate dispersion or into parquet varnishes (one- or two-component). After a ripening time of 24 hours of the stirred varnish were shaken in a measuring cylinder and the volume (plus foam height) read off. The lower the volume/the foam height, the more effective the defoamer. The varnish was then poured onto a polyester film which in turn was secured to an obliquely positioned wall (deviating 25 [deg.] from the vertical). The film is assessed for wetting defects during and after the drying of the varnish. As in the assessment described above, the wetting defects and also the foam present are in turn assessed according to the grades 1 to 5 (tables 4 to 7).

TABLE 4

Assessment of the performance testing in high-gloss emulsion paints based on pure acrylate (Acronal DS 6250)

|  | Concentration (% by weight) | Visual assessment of the paint surface for foam bubbles | | | Visual assessment of the paint surface for wetting defects | | |
|---|---|---|---|---|---|---|---|
|  |  | 24 h after production of the paint | after heat storage of the paint for 2 weeks at 50° C. | after heat storage of the paint for 4 weeks at 50° C. | 24 h after production of the paint | after heat storage of the paint for 2 weeks at 50° C. | after heat storage of the paint for 4 weeks at 50° C. |
| Example 1E | 1.00 | 1 no foam bubbles | 1 no foam bubbles | 1 to 2 very few small craters | 1 no wetting defects | 1 no wetting defects | 1 to 2 very minor wetting defects |
| Example 2E | 1.00 | 1 no foam bubbles | 1 no foam bubbles | 1 to 2 very few small craters | 1 no wetting defects | 1 no wetting defects | 1 to 2 very minor wetting defects |
| Example 3E | 1.00 | 1 to 2 very few small foam bubbles | 2 few and small foam bubbles | 4 large and small foam bubbles | 1 no wetting defects | 2 minor wetting defects | 4 large and small foam bubbles |
| Example 4E | 1.00 | 1 no foam bubbles | 1 no foam bubbles | 1 to 2 very few small craters | 1 no wetting defects | 1 no wetting defects | 1 to 2 very minor wetting defects |
| Example 5E | 1.00 | 1 no foam bubbles | 1 no foam bubbles | 1 to 2 very few small craters | 1 no wetting defects | 1 no wetting defects | 1 to 2 very minor wetting defects |
| Example 6E | 1.00 | 1 to 2 very few small foam bubbles | 3 many large and small foam bubbles | 4 large and small foam bubbles | 1 no wetting defects | 2 minor wetting defects | 4 large and small foam bubbles |
| Example 7E | 1.00 | 1 no foam bubbles | 1 no foam bubbles | 1 to 2 very few small craters | 1 no wetting defects | 1 no wetting defects | 1 to 2 very minor wetting defects |
| Example 8E | 1.00 | 1 no foam bubbles | 1 no foam bubbles | 1 to 2 very few small craters | 1 no wetting defects | 1 no wetting defects | 1 to 2 very minor wetting defects |
| Example 9E | 1.00 | 1 to 2 very few small foam bubbles | 2 few and small foam bubbles | 5 many large and small foam bubbles | 1 no wetting defects | 2 minor wetting defects | 5 very significant wetting defects |
| Example 10E | 1.00 | 1 no foam bubbles | 1 no foam bubbles | 1 to 2 very few small craters | 1 no wetting defects | 1 no wetting defects | 1 to 2 very minor wetting defects |
| Example 11E | 1.00 | 1 no foam bubbles | 1 no foam bubbles | 1 to 2 very few small craters | 1 no wetting defects | 1 no wetting defects | 1 to 2 very minor wetting defects |
| Example 12E | 1.00 | 1 to 2 very few small foam bubbles | 3 many large and small foam bubbles | 4 large and small foam bubbles | 1 no wetting defects | 2 minor wetting defects | 4 large and small foam bubbles |
| Example CE | 1.00 | 1 to 2 very few small foam bubbles | 3 many large and small foam bubbles | 5 many large and small foam bubbles | 1 no wetting defects | 2 minor wetting defects | 5 very significant wetting defects |

TABLE 5

Assessment of the performance testing in one-component parquet varnishes based on polyurethane/acrylate dispersion (Alberdingk CUR 99/Primal 3188)

|  | Concentration (% by weight) | Visual assessment of the paint surface for foam bubbles | | | Visual assessment of the paint surface for wetting defects | | |
|---|---|---|---|---|---|---|---|
|  |  | 24 h after production of the paint | after heat storage of the paint for 2 weeks at 50° C. | after heat storage of the paint for 4 weeks at 50° C. | 24 h after production of the paint | after heat storage of the paint for 2 weeks at 50° C. | after heat storage of the paint for 4 weeks at 50° C. |
| Example 1E | 1.00 | 1 no foam bubbles | 1 no foam bubbles | 1 to 2 very few small craters | 1 no wetting defects | 1 no wetting defects | 2 orange peel |
| Example 2E | 1.00 | 1 no foam bubbles | 1 no foam bubbles | 1 to 2 very few small craters | 1 no wetting defects | 1 no wetting defects | 2 orange peel |
| Example 3E | 1.00 | 1 no foam bubbles | 1 no foam bubbles | 2 to 3 few small craters | 1 no wetting defects | 1 no wetting defects | 2 orange peel |
| Example 4E | 1.00 | 1 no foam bubbles | 1 no foam bubbles | 1 to 2 very few small craters | 1 no wetting defects | 1 no wetting defects | 2 orange peel |

TABLE 5-continued

Assessment of the performance testing in one-component parquet varnishes based on polyurethane/acrylate dispersion (Alberdingk CUR 99/Primal 3188)

| | Concentration (% by weight) | Visual assessment of the paint surface for foam bubbles | | | Visual assessment of the paint surface for wetting defects | | |
|---|---|---|---|---|---|---|---|
| | | 24 h after production of the paint | after heat storage of the paint for 2 weeks at 50° C. | after heat storage of the paint for 4 weeks at 50° C. | 24 h after production of the paint | after heat storage of the paint for 2 weeks at 50° C. | after heat storage of the paint for 4 weeks at 50° C. |
| Example 5E | 1.00 | 1 no foam bubbles | 1 no foam bubbles | 1 to 2 very few small craters | 1 no wetting defects | 1 no wetting defects | 2 orange peel |
| Example 6E | 1.00 | 1 no foam bubbles | 1 no foam bubbles | 2 to 3 few small craters | 1 no wetting defects | 1 no wetting defects | 2 orange peel |
| Example 7E | 1.00 | 1 no foam bubbles | 1 no foam bubbles | 1 to 2 very few small craters | 1 no wetting defects | 1 no wetting defects | 2 orange peel |
| Example 8E | 1.00 | 1 no foam bubbles | 1 no foam bubbles | 1 to 2 very few small craters | 1 no wetting defects | 1 no wetting defects | 2 orange peel |
| Example 9E | 1.00 | 1 no foam bubbles | 2 large and small foam bubbles | 2 to 3 few small craters | 1 no wetting defects | 1 no wetting defects | 3 wetting defects |
| Example 10E | 1.00 | 1 no foam bubbles | 1 no foam bubbles | 1 to 2 very few small craters | 1 no wetting defects | 1 no wetting defects | 2 orange peel |
| Example 11E | 1.00 | 1 no foam bubbles | 1 no foam bubbles | 1 to 2 very few small craters | 1 no wetting defects | 1 no wetting defects | 2 orange peel |
| Example 12E | 1.00 | 1 no foam bubbles | 2 large and small foam bubbles | 2 to 3 few small craters | 1 no wetting defects | 1 no wetting defects | 3 wetting defects |
| Example CE | 1.00 | 1 to 2 very few small foam bubbles | 2 large and small foam bubbles | 4 many large and small foam bubbles | 1 no wetting defects | 2 minor wetting defects | 4 significant wetting defects |

TABLE 6

Assessment of the performance testing in aqueous two-component parquet varnishes based on acrylate/isocyanate (Luhydran N 850 S/Bayhydur 305)

| | Concentration (% by weight) | Visual assessment of the paint surface for foam bubbles | | | Visual assessment of the paint surface for wetting defects | | |
|---|---|---|---|---|---|---|---|
| | | 24 h after production of the paint | after heat storage of the paint for 2 weeks at 50° C. | after heat storage of the paint for 4 weeks at 50° C. | 24 h after production of the paint | after heat storage of the paint for 2 weeks at 50° C. | after heat storage of the paint for 4 weeks at 50° C. |
| Example 1E | 1.00 | 1 no foam bubbles | 1 no foam bubbles | 1 to 2 very few small craters | 1 no wetting defects | 1 no wetting defects | 2 orange peel |
| Example 2E | 1.00 | 1 no foam bubbles | 1 no foam bubbles | 1 to 2 very few small craters | 1 no wetting defects | 1 no wetting defects | 2 orange peel |
| Example 3E | 1.00 | 1 no foam bubbles | 1 no foam bubbles | 2 few small craters | 1 no wetting defects | 1 no wetting defects | 2 wetting defects |
| Example 4E | 1.00 | 1 no foam bubbles | 1 no foam bubbles | 1 to 2 very few small craters | 1 no wetting defects | 1 no wetting defects | 2 orange peel |
| Example 5E | 1.00 | 1 no foam bubbles | 1 no foam bubbles | 1 to 2 very few small craters | 1 no wetting defects | 1 no wetting defects | 2 wetting defects |
| Example 6E | 1.00 | 1 no foam bubbles | 1 no foam bubbles | 2 few small craters | 1 no wetting defects | 1 no wetting defects | 2 orange peel |
| Example 7E | 1.00 | 1 no foam bubbles | 1 no foam bubbles | 1 to 2 very few small craters | 1 no wetting defects | 1 no wetting defects | 2 orange peel |
| Example 8E | 1.00 | 1 no foam bubbles | 1 no foam bubbles | 1 to 2 very few small craters | 1 no wetting defects | 1 no wetting defects | 2 orange peel |

TABLE 6-continued

Assessment of the performance testing in aqueous two-component parquet varnishes based on acrylate/isocyanate (Luhydran N 850 S/Bayhydur 305)

| | | Visual assessment of the paint surface for foam bubbles | | | Visual assessment of the paint surface for wetting defects | | |
|---|---|---|---|---|---|---|---|
| | Concentration (% by weight) | 24 h after production of the paint | after heat storage of the paint for 2 weeks at 50° C. | after heat storage of the paint for 4 weeks at 50° C. | 24 h after production of the paint | after heat storage of the paint for 2 weeks at 50° C. | after heat storage of the paint for 4 weeks at 50° C. |
| Example 9E | 1.00 | 1 no foam bubbles | 1 no foam bubbles | 2 to 3 few small craters | 1 no wetting defects | 1 no wetting defects | 3 wetting defects |
| Example 10E | 1.00 | 1 no foam bubbles | 1 no foam bubbles | 1 to 2 very few small craters | 1 no wetting defects | 1 no wetting defects | 2 orange peel |
| Example 11E | 1.00 | 1 no foam bubbles | 1 no foam bubbles | 1 to 2 very few small craters | 1 no wetting defects | 1 no wetting defects | 2 orange peel |
| Example 12E | 1.00 | 1 no foam bubbles | 1 no foam bubbles | 2 to 3 few small craters | 1 no wetting defects | 1 no wetting defects | 3 wetting defects |
| Example CE | 1.00 | 1 to 2 very few small foam bubbles | 2 large and small foam bubbles | 4 many large and small foam bubbles | 1 no wetting defects | 2 minor wetting defects | 4 significant wetting defects |

TABLE 7

Assessment of the performance testing in aqueous two-component parquet varnishes based on acrylate/isocyanate (Luhydran N 850 S/Bayhydur 305)

| | | Defoamer activity according to the stirring test method | | | Visual assessment of the varnish surface for wetting defects | | |
|---|---|---|---|---|---|---|---|
| | Concentration (% by weight) | 24 h after production of the varnish | after heat storage of the varnish for 2 weeks at 50° C. | after heat storage of the varnish for 4 weeks at 50° C. | 24 h after production of the varnish | after heat storage of the varnish for 2 weeks at 50° C. | after heat storage of the varnish for 4 weeks at 50° C. |
| Example 1E | 1.00 | 50 ml/g | 51 ml/g | 53 ml/g | 1 no wetting defects | 1 no wetting defects | 2 orange peel |
| Example 2E | 1.00 | 50 ml/g | 53 ml/g | 57 ml/g | 1 no wetting defects | 1 no wetting defects | 2 orange peel |
| Example 3E | 1.00 | 50 ml/g | 51 ml/g | 53 ml/g | 1 no wetting defects | 1 no wetting defects | 2 wetting defects |
| Example 4E | 1.00 | 50 ml/g | 51 ml/g | 53 ml/g | 1 no wetting defects | 1 no wetting defects | 2 orange peel |
| Example 5E | 1.00 | 50 ml/g | 53 ml/g | 57 ml/g | 1 no wetting defects | 1 no wetting defects | 2 orange peel |
| Example 6E | 1.00 | 50 ml/g | 51 ml/g | 53 ml/g | 1 no wetting defects | 1 no wetting defects | 2 wetting defects |
| Example 7E | 1.00 | 50 ml/g | 51 ml/g | 53 ml/g | 1 no wetting defects | 1 no wetting defects | 2 orange peel |
| Example 8E | 1.00 | 50 ml/g | 53 ml/g | 55 ml/g | 1 no wetting defects | 1 no wetting defects | 2 orange peel |
| Example 9E | 1.00 | 50 ml/g | 51 ml/g | 53 ml/g | 1 no wetting defects | 1 no wetting defects | 3 wetting defects |
| Example 10E | 1.00 | 50 ml/g | 51 ml/g | 53 ml/g | 1 no wetting defects | 1 no wetting defects | 2 orange peel |
| Example 11E | 1.00 | 50 ml/g | 53 ml/g | 56 ml/g | 1 no wetting defects | 1 no wetting defects | 2 orange peel |
| Example 12E | 1.00 | 50 ml/g | 51 ml/g | 53 ml/g | 1 no wetting defects | 1 no wetting defects | 3 wetting defects |
| Example CE | 1.00 | 51 ml/g | 55 ml/g | 63 ml/g | 1 no wetting defects | 2 minor wetting defects | 4 significant wetting defects |

Formulas Used
High-gloss emulsion paint based on pure acrylate (Acronal DS 6250)
Part 1: disperse

| Water | 41 g | |
|---|---|---|
| Dispex ® CX 4320 | 20 g | (BASF) |
| Dispex GA40 | 15 g | (BASF AG) |
| Parmetol A 26 | 2 g | (Schülke und Mayr) |
| ViscoPlus 3030 | 15 g | (Evonik) |
| Collacral PU 75, 5% | 15 g | (BASF) |
| Titanium dioxide CR 828 | 225 g | (Tronox) | well.
Part 2:

| Lusolvan FBH | 15 g | (BASF AG) |
|---|---|---|
| Solvenon DPM | 17 g | (Dow Chemical Company) |
| LAPONITE-S 482, 25% | 6 g | (Byk) |
| Acronal DS 6250 | 570 g | (BASF AG) |
| Water | 51 g | |

Initially charge part 2 and add part 1 while stirring.
One-component parquet varnish based on polyurethane/acrylate dispersion (Alberdingk CUR 99/Primal 3188)
Combine all components while stirring.

| Primal 3188 | 506 g | (Dow Chemical Company) |
|---|---|---|
| Alberdingk CUR 99 | 255 g | (Alberdingk Boley) |
| Water | 78 g | |
| Butyl glycol | 40 g | (Dow Chemical Company) |
| Dowanol DPnB | 12 g | (Dow Chemical Company) |
| Acrysol RM 8 | 5 g | (Rohm and Hass S.A., 60489 Frankfurt) |
| Aquacer 513 | 40 g | (Byk) |
| Water | 64 g | |

Aqueous two-component parquet varnish based on acrylate/isocyanate (Luhydran N 850 S/Bayhydur 305)
Part 1: disperse

| Dowanol DPnB | 40 g | (Dow Chemical Company) |
|---|---|---|
| Propylene glycol | 20 g | |
| Deuteron MK | 20 g | (Deuteron) |
| Butyl diglycol | 80 g | |
| Water | 40 g | | well.
Part 2:

| Luhydran N 850 S | 1450 g | (BASF) |
|---|---|---|
| Poligen WE 1 | 80 g | (BASF) |
| Water | 160 g | |
| Schwego Pur 8020 | 40 g | (Schwegmann GmbH, 53501 Grafschaft Gelsdorf) |

Initially charge part 2 and add part 1 while stirring.
Hardener Component

| Bayhydur 305 | 65 g | (Bayer Material Science AG) |
|---|---|---|
| Proglyde DMPA | 35 g | (Dow Chemical Company) |

The invention claimed is:

1. A branched SiOC-linked polyethersiloxane, comprising:
formula (I):

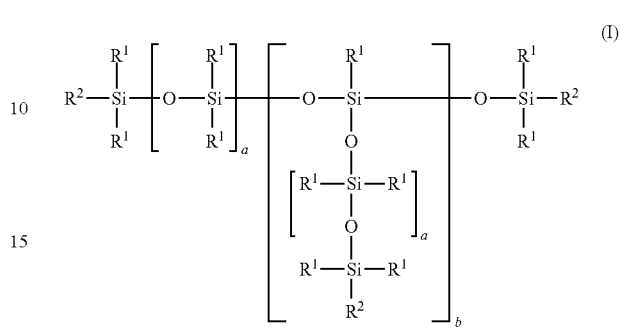

wherein
$R^1$ is an alkyl radical having 1 to 4 carbon atoms or a phenyl radical,
b has a value of from 1 to 10,
a has a value of from 1 to 200,
and
$R^2$ denotes identical or different polyether radicals, but at least one radical $R^2$ is a structural element radical of formula (II):

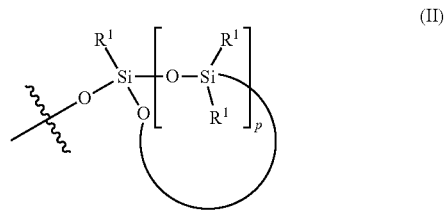

wherein p=at least 2 and
wherein said branched SiOC-linked polyethersiloxane contains at least 5% by weight of siloxane cycles.

2. The branched SiOC-linked polyethersiloxane according to claim 1, wherein a molar percentage of the structural element radical of formula (II), based on an entirety of all Si atoms, is less than a molar percentage of the polyether radicals, based on the entirety of all Si atoms.

3. The branched SiOC-linked polyethersiloxane according to claim 1, wherein a molar ratio of the polyether radicals to the structural element radical of formula (II) is at least 1:0.9.

4. The branched SiOC-linked polyethersiloxane according to claim 1, wherein the polyether radicals are based on one or more identical or different polyetherols of formula (III):

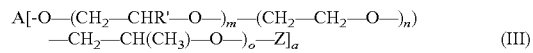

wherein
A is either hydrogen or a saturated or an unsaturated organic radical comprising at least one carbon atom,
R' is independently a saturated alkyl group comprising 2-18 carbon atoms or an aromatic radical,
Z is hydrogen,
m equals from 0 to 50,
n equals from 0 to 250, equals from 0 to 250, and
a equals from 1 to 8,
wherein a sum total of m, n, and o is equal to or greater than 1.

5. A product selected from the group consisting of defoamers, deaerating agents, PU foam stabilizers, emulsifiers, demulsifiers, paint, or levelling additives, comprising:
the branched SiOC-linked polyethersiloxane according to claim 1.

6. A method, comprising:
producing a product selected from the group consisting of PU foam stabilizers, defoamers, deaerating agents, emulsifiers, demulsifiers, paint additives, and levelling additives, with the branched SiOC-linked polyethersiloxane according to claim 1.

7. A method, comprising:
producing a product selected from the group consisting of diesel defoamers, hydrophobizing agents; polymer dispersions; adhesives; sealants; paper towels; cleaning and care formulations for the household or for industrial applications; cosmetic, pharmaceutical, and dermatological compositions; construction material compositions; and thermoplastic shaped bodies; with the branched SiOC-linked polyethersiloxane according to claim 1.

8. A method, comprising:
using the branched SiOC-linked polyethersiloxane according to claim 1 in at least one of the following processes:
an extrusion of thermoplastics,
protecting crops,
cleaning and care of hard surfaces,
surface treating of fibres, particles, or fabrics, and
coating of fillers.

9. A process for producing the branched SiOC-linked polyethersiloxane according to
claim 1, comprising:
reacting a polyetherol with a superacidic, equilibrated acetoxy group-bearing, branched polysiloxane of following formula (IV):

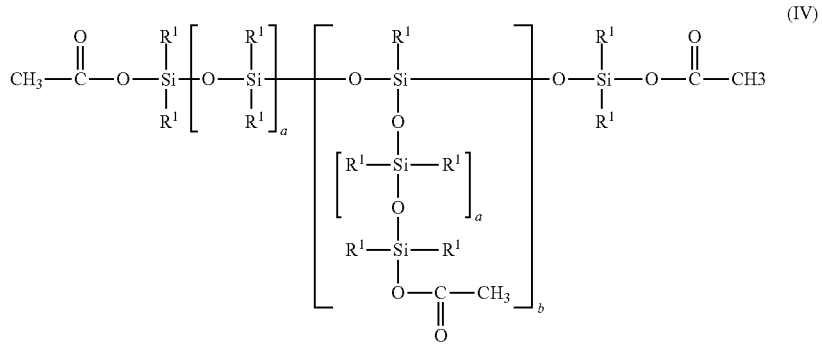

wherein
$R^1$ is an alkyl radical having 1 to 4 carbon atoms or a phenyl radical,
b has a value of from 3 to 10, and
a has a value of from 1 to 200.

10. The process according to claim 9, wherein the polyetherol corresponds to formula (III)

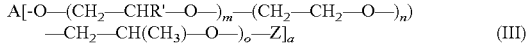

wherein
A is either hydrogen or a saturated or an unsaturated organic radical comprising at least one carbon atom,
R' is independently a saturated alkyl group comprising 2-18 carbon atoms or an aromatic radical,
Z is hydrogen,
m equals from 0 to 50,
n equals from 0 to 250, and
equals from 0 to 250, and
a equals from 1 to 8,
wherein a sum total of m, n, and o is equal to or greater than 1.

11. The process according to claim 9, wherein the polyetherol consists of hydrogen atoms, oxygen atoms, and carbon atoms.

12. The process according to claim 9, wherein at least 1 mol of polyether-bonded OH functionality is used per mole of acetoxy group of the superacidic, equilibrated acetoxy group-bearing, branched polysiloxane.

13. The process according to claim 9, wherein a replacement of siloxane-bonded acetoxy groups via the reacting with the polyetherol is conducted in a temperature range from 40° C. to 180° C.

14. The process according to claim 9, wherein the replacement of the siloxane-bonded acetoxy groups via the reacting with the polyetherol is conducted at reduced pressure and/or while passing through an inert gas.

15. The process according to claim 9, wherein the replacement of the siloxane-bonded acetoxy groups via the reacting with the polyetherol is effected at least in the presence of a base.

16. The process according to claim 9, wherein the replacement of the siloxane-bonded acetoxy groups via the reacting with the polyetherol is effected using an inert solvent and acetic acid.

17. The process according to claim 9, wherein the replacement of the siloxane-bonded acetoxy groups via the reacting with the polyetherol is done without solvent.

18. The branched SiOC-linked polyethersiloxane according to claim 1,
wherein at least 90% of the radicals R' are methyl radicals,
wherein a has a value of 10 to 100, and
wherein, for the structural element radical of formula (II), p=3.

19. The branched SiOC-linked polyethersiloxane according to claim 3, wherein the molar ratio of the polyether radicals to the molar ratio of the structural element radical of formula (II) is at least 1:0.2.

20. The branched SiOC-linked polyethersiloxane according to claim 4, wherein, for the one or more identical or different polyetherols of formula (III), A is an organic radical comprising at least one carbon atom of an organic starter compound for preparing the polyetherol, selected from the group consisting of a methyl, ethyl, propyl, isopropyl, butyl, isobutyl, vinyl and allyl groups,
R' is independently an ethyl group or a phenyl radical,
m equals from 0 to 20,
n equals from 5 to 200,
o equals from 5 to 200, and
a equals from 1, 2, 3, or 4.

21. The branched SiOC-linked polyethersiloxane according to claim 1, wherein a has a value of from 3 to 70 when b is $\geq 1$ and $\leq 4$.

22. The branched SiOC-linked polyethersiloxane according to claim 1, wherein a has a value of from 3 to 30 when b is $>4$.

23. The process according to claim 9, wherein a has a value of from 3 to 70 when b is $\geq 1$ and $\leq 4$.

24. The process according to claim 9, wherein, wherein a has a value of from 3 to 30 when b is $>4$.

* * * * *